US009582906B2

(12) United States Patent
Ra et al.

(10) Patent No.: US 9,582,906 B2
(45) Date of Patent: Feb. 28, 2017

(54) METHOD FOR SUBJECTING PET IMAGE TO MOTION COMPENSATION AND ATTENUATION CORRECTION BY USING SMALL NUMBER OF LOW-RADIATION-DOSE CT IMAGES

(71) Applicant: Korea Advanced Institute of Science and Technology, Daejeon (KR)

(72) Inventors: Jong-beom Ra, Daejeon (KR); Woo-hyun Nam, Daejeon (KR); Il-jun Ahn, Daejeon (KR); Ji-hye Kim, Daejeon (KR); Yong-jin Jang, Daejeon (KR); Young-Zoon Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/421,769

(22) PCT Filed: Dec. 14, 2012

(86) PCT No.: PCT/KR2012/010898
§ 371 (c)(1),
(2) Date: Feb. 13, 2015

(87) PCT Pub. No.: WO2014/069712
PCT Pub. Date: May 8, 2014

(65) Prior Publication Data
US 2015/0221104 A1 Aug. 6, 2015

(30) Foreign Application Priority Data

Oct. 29, 2012 (KR) .................. 10-2012-0120713
Dec. 12, 2012 (KR) .................. 10-2012-0144198

(51) Int. Cl.
*G06T 11/00* (2006.01)

(52) U.S. Cl.
CPC ....... *G06T 11/005* (2013.01); *G06T 2211/416* (2013.01)

(58) Field of Classification Search
CPC .................. G06T 2211/416; G06T 11/005
(Continued)

(56) References Cited

U.S. PATENT DOCUMENTS

2007/0081704 A1\* 4/2007 Pan .......................... G06T 5/50
382/128
2009/0253980 A1 10/2009 Wollenweber et al.
2012/0078089 A1\* 3/2012 Wollenweber ....... A61B 6/5258
600/427

FOREIGN PATENT DOCUMENTS

JP 2003-232855 A 8/2003
JP 2009-156856 A 7/2009
(Continued)

OTHER PUBLICATIONS

International Search Report in International Application No. PCT/KR2012/010898, filed Dec. 14, 2012.

*Primary Examiner* — Gregory F Cunningham
(74) *Attorney, Agent, or Firm* — Saliwanchik, Lloyd & Eisenschenk

(57) ABSTRACT

The present invention relates to a method for motion compensation and state-of-motion specific attenuation correction of positron tomography images by using a small number of low-radiation-dose computer tomography images. The method of the present invention comprises the steps of: acquiring respiration-specific PET data; acquiring CT images from at least 2 different respirations, and using same to generate a virtual 4D CT image; matching the 4D CT image and the respiration-specific PET data, and selecting 3D CT images accurately corresponding to specific respirations; using the selected results to extract respiration motion displacement field information between respiration-specific (Continued)

PET data; using the selected CT images to subject the respiration-specific PET data to respiration-specific attenuation and scattering correction; and using the corrected respiration-specific PET data items and the extracted respiration motion displacement field information items to carry out respiration compensation and reconstruction.

15 Claims, 5 Drawing Sheets

(58) Field of Classification Search
USPC .......................................................... 382/131
See application file for complete search history.

(56) References Cited

FOREIGN PATENT DOCUMENTS

| | | | | | |
|---|---|---|---|---|---|
| JP | 2009156856 | A | * | 7/2009 | ............. G01T 1/161 |
| KR | 10-1080605 | B1 | | 11/2011 | |
| KR | 101080605 | B1 | * | 11/2011 | ............. A61B 5/055 |

* cited by examiner

METHOD FOR SUBJECTING PET IMAGE TO MOTION COMPENSATION AND ATTENUATION CORRECTION BY USING SMALL NUMBER OF LOW-RADIATION-DOSE CT IMAGES

CROSS-REFERENCE TO RELATED APPLICATIONS

This application is the U.S. national stage application of International Patent Application No. PCT/KR2012/010898, filed Dec. 14, 2012, which claims priority to Korean Application Nos. 10-2012-0144198, filed Dec. 12, 2012, and 10-2012-0120713, filed Oct. 29, 2012, the disclosures of each of which are incorporated herein by reference in their entirety.

TECHNICAL FIELD

Embodiments of the inventive concepts described herein relate to a method for generating a Positron Emission Tomography (PET) image, and more particularly, relate to a method for subjecting a PET image to motion compensation and motion-state attenuation correction using the small number of low-radiation-dose Computed Tomography (CT) images.

BACKGROUND ART

A PET image may be a molecular picture that provides functional information such as metabolism of the body and may be helpfully used for the early detection of cancer and the treatment. Since a long time (e.g., about tens of minutes) is taken to obtain data of whole-body PET images, the scan is conducted while breathing freely. At this time, motions of chest/abdomen organs due to respirations may make the quality of PET images deteriorate due to blurring.

Meanwhile, various image distortion corrections may be subjected to construct good PET images. In case of attenuation correction, in general, correction may be made using X-ray CT images obtained by the same system (e.g., PET/CT system), just before PET image scanning. In case of a CT image, it is possible to obtain data quickly, for example, within a few seconds. For this reason, scanning may be made without breathing around a specific breathing. The attenuation correction may not be exactly performed due to a respiratory difference between the CT images and the PET image, thereby making the attenuation correction distorted. The distortion may act as a factor of hindering quantitative analysis of PET images and may make the PET images blurred. Deterioration of the quality of the PET images due to the above-described causes must be solved because hindering exact diagnosis and treatment.

To solve the above-described problems, there is widely used a respiratory gating PET imaging method that uses respiratory gating equipment upon obtaining PET images and classifies PET data according to respirations to obtain various respiratory states of PET images of which the respiratory motion is improved. However, to construct PET images of respective respirations effectively, an attenuation correction may be performed using a phase-matched CT image exactly corresponding to each respiratory state. Moreover, the quality of phase-matched PET images may be considerably lowered in terms of the signal to noise ratio (SNR). To improve the deterioration of the quality of PET images, there may be performed motion compensation in which motion information between phase-matched PET images is well estimated and other phase-matched PET images are converted into one respiration state using the estimated motion information.

As a study for phase-matched attenuation correction and respiratory motion estimation and compensation, first, there is proposed a method in which a CT image acquired using a respiratory gating CT imaging (4D CT imaging) method is used as upon acquiring PET images. This method is useful because the phase-matched attenuation correction is performed using the obtained phase-matched CT images and respiratory motion information is relatively exactly obtained from the acquired 4D images. However, the 4D CT imaging method is problematic in that radiation exposure is significantly increased as compared with the CT scanning. For this reason, the 4D CT imaging method is being rejected according to the ALARA (As Low As Reasonably Achievable) rule recommended by the ICRP from 1965. Moreover, the problem that a respiration of a phase-matched PET image is not identical to that of a phase-matched CT image frequently occurs. In this case, respiratory information obtained from the CT can be erroneously applied, thereby lowering correction and compensation effects. To correct this, there is an inconvenience that a user revises the lowering of the correction and compensation effects manually for a long time.

Another method is a method in which a CT image corresponding to one respiration is obtained as at CT acquisition of a conventional PET/CT and PET images by the respiration are used. Respiratory motion may be estimated through registration between phase-matched PET images. However, since the phase-matched PET image includes a lot of noise and activity concentration distributions of phase-matched PET images are different from each other, it is difficult to have confidence in the motion information through the registration. Also, since phase-matched PET images not experiencing the attenuation correction are low in a characteristic capable of being used for the registration, it is difficult to expect high registration performance. Also, for the phase-matched attenuation correction, it is necessary to convert the previously obtained CT image of a specific respiration according to each respiratory state using motion information obtained through the registration between phase-matched PET images. It is also difficult to have confidence in the accuracy. Rather, the probability that an incorrectly converted CT image makes the PET images distorted may be high.

DISCLOSURE

Technical Problem

Embodiments of the inventive concept provide a method for performing motion compensation and phase-matched attenuation correction of PET images using the small number of low-radiation-dose CT images.

Also, embodiments of the inventive concept provide a method for producing medical information that enables a cancer to be diagnosed more exactly.

Objects of the inventive concept are not limited to the above-mentioned objects. Other objects and advantages of the inventive concept not mentioned will be understood by the following description and will be understood more clearly by embodiments of the inventive concept. Also, the objects and advantages of the inventive concept can be easily realized by the means as claimed and combinations thereof.

Technical Solution

One aspect of embodiments of the inventive concept is directed to provide a method for constructing a positron emission tomography (PET) image. The method may include acquiring phase-matched PET data; acquiring CT images corresponding to at least two different respiratory states and generating a virtual 4D CT image using the acquired CT images; selecting 3D CT images, corresponding to the phase-matched PET data, from among the 4D CT images; and performing phase-matched attenuation correction and phase-matched scattering correction on the phase-matched PET data using the selected 3D CT images.

The method may further include performing respiratory motion compensation and reconstruction on the phase-matched PET data, suffering the attenuation correction and the scattering correction, using a selected 3D CT image corresponding to each respiration.

Another aspect of embodiments of the inventive concept is directed to provide a method for generating a medical image. The method may include acquiring a plurality of medical images with respect to a same diagnosis target; dividing the acquired medical images into regions based on a motion characteristic; performing registration among the plurality of medical images every region; and merging the image-registered regions into one image.

Still another aspect of embodiments of the inventive concept is directed to provide a method for generating a medical image. The method may include acquiring phase-matched PET data corresponding to at least two or more different registrations; estimating phase-matched motion information using the phase-matched CT image; and generating a virtual 4D CT image using the phase-matched motion information. The generating of a virtual 4D CT image may include dividing the CT images corresponding to the different respirations into regions based on a motion characteristic; performing image registration every region; and merging the image-registered regions.

A further aspect of embodiments of the inventive concept is directed to provide a method for determining a CT image corresponding to phase-matched PET data. The method may include receiving at least one CT images and at least one PET data classified according to a respiratory motion; and matching the input CT images and PET data. Attenuation correction, and reconstruction may be performed with respect to the phase-matched PET, data and a CT image corresponding to phase-matched PET data may be selected using a distortion degree of attenuation correction measured from the reconstructed PET image.

Advantageous Effects

According to an exemplary embodiment of the inventive concept, it is possible to generate a virtual 4D CT image that is helpful in improving the quality of PET images using the small number of low-radiation-dose CT images without acquiring 4D CT practically. Thus, the burden on additional radiation exposure is markedly reduced. The amount of radiation exposure at general PET/CT scanning is the same as or less than that for CT acquisition.

Also, according to an exemplary embodiment of the inventive concept, phase-matched motion information is estimated using a high-definition CT image, thereby making it possible to estimate motion information more exactly from a PET image that includes a lot of noise and distortion.

Further, convenience on cancer diagnosis and a value of the treatment are improved through a more accurate, high-definition PET imaging method according to an exemplary embodiment of the inventive concept.

In addition, the accuracy of image registration is further improved by applying motion characteristics of internal and external organs according to a respiration through a region-specific non-rigid matching framework according to an exemplary embodiment of the inventive concept. Moreover, the non-rigid matching framework can be extended to registration of images acquired from other medical image equipment.

Also, is variously extended and applied a technique for searching for CT corresponding to phase-matched PET using a distortion phenomenon of the attenuation correction, a matching framework for exactly searching for a 3D CT image, corresponding to phase-matched PET data, from among 4D CT images according to an exemplary embodiment of the inventive concept. For example, upon matching practically acquired conventional 4D CT images and phase-matched PET images or when PET data, corresponding to a specific respiration, and CT images of different respiratory states are provided, an exact CT image corresponding to a respiration may be acquired by measuring how much attenuation distortion occurs between them and iteratively changing a CT image such that the attenuation distortion is minimized. This may be implemented by the following embodiments.

Also, cancer diagnosis and treatment are conducted using image information, by implementing a 4D display with 4D CT images, 3D CT images, phase-matched PET image, and so on that are generated according to an exemplary embodiment of the inventive concept.

BEST MODE

Figure 1:
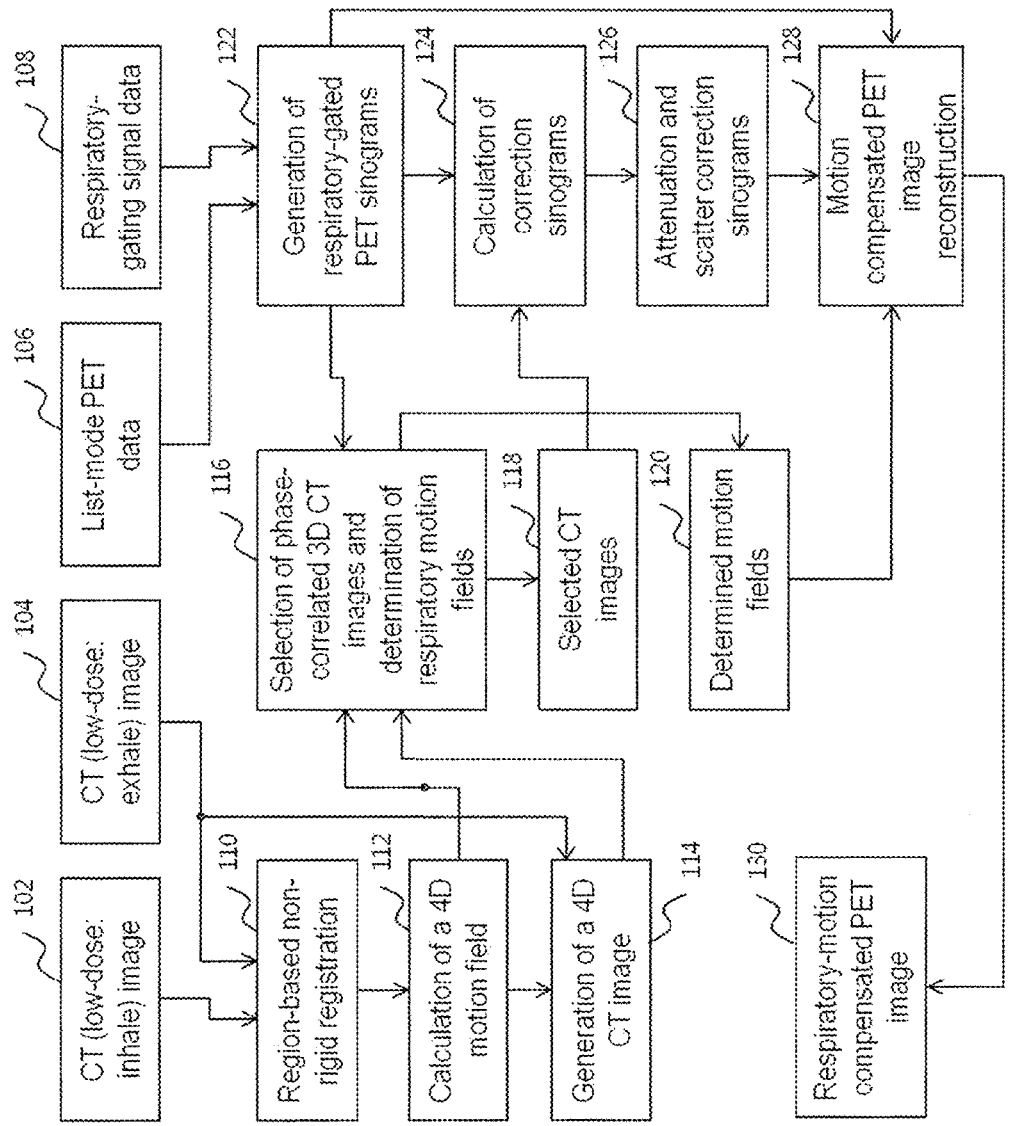
FIG. 1 is a flowchart showing a respiratory motion compensation and attenuation correction method using low-radiation-dose CT images, according to an exemplary embodiment of the inventive concept.

Hereinafter, exemplary embodiments of the present invention will be described. In the drawings, the thickness and spacing are schematically illustrated for convenience in description and may be exaggerated in comparison to an actual thickness. In describing the present invention, a well-known configuration unrelated to the gist of the present invention may be omitted.

In the specification, in adding reference numerals to elements throughout the drawings, it is to be noted that like reference numerals refer to like elements even though elements are shown in different drawings.

Embodiments of the inventive concept relate to provide a method for subjecting motion compensation and phase-matched attenuation correction to PET images using the small number of low-radiation-dose CT images. That is, embodiments of the inventive concept relate to a method a method for performing phase-matched attenuation correction and respiratory motion compensation by constructing and using a virtual 4D CT image without acquiring phase-matched CT actually. Embodiments of the inventive concept relate to provide a workflow for acquiring the small number of low-radiation-dose CT images (e.g., two to three sheets). Also, embodiments of the inventive concept relate to provide a non-rigid registration method to which motion characteristics of internal, external organs according to a respiration is applied and to provide a matching method for searching for a CT image corresponding to a phase-matched PET image among virtual 4D CT images generated.

FIG. 1 is a flowchart showing a respiration motion compensation and attenuation correction method using low-radiation-dose CT images.

1. CT Image and PET Data Acquisition (102, 104, 106, 108)

At PET/CT scanning, in general, a sheet of 3D CT image is taken at a specific respiration. At this time, when a used CT radiation-dose condition is "1", a radiation-doze condition according to an exemplary embodiment of the inventive concept is adjusted to be the half or quarter of the used CT radiation-dose condition, and CT images are acquired at two or three different respiratory states (e.g., inhalation and exhalation or inhalation, exhalation and an intermediate respiration). The radiation dose may be adjusted by controlling an X-ray-tube current, a voltage, a rotation time, a rotation pitch, and so on. Is used a current control manner relatively insensitive to influence of image distortion, PET data may be acquired in a list-mode PET data acquisition mode after mounting a respiratory gating apparatus on a patient's chest or abdomen. Preferably, CT images corresponding to the different respiratory states may be acquired using about 10~50% of a radiation dose needed upon taking an independent CT image.

2. Classification of PET Data Based on Respiration Motion (122)

A. PET system obtains list-mode data by acquiring phase-matched PET data, and a respiratory gating apparatus obtains information on a respiratory waveform (hereinafter referred to as "respiratory waveform information") monitored during acquisition. PET sinogram data classified according to a respiration is generated using the list-mode data and the respiratory waveform information. Respiratory classification may be made using a time (phase) based method in which respirations are classified using a respiratory period and an amplitude based method in which respirations are classified using an amplitude value of a respiration.

3. Region-Specific Registration Among Acquired CT Images (110)

Embodiments of the inventive concept relate to construct a virtual 4D CT image using two or three sheets of low-radiation-dose CT images. An exact image registration technique is required to construct a reliable 4D CT image.

A chest/abdomen image is classified as organs of internal regions, such as lung, heart, liver, kidney, large intestine, and so on, or as textures of external regions, such as rib, spine, and muscular regions adjacent thereto. The internal region organs are soft and non-rigid and show a local motion, but the external regions are rigid show a global motion.

B-spline Free Form Deformation (FFD) is conventionally used for non-rigid image registration by reason of efficiency. However, in the event that motions at adjacent regions are sharply changed due to a characteristic of the B-spline FFD model, the performance of registration on relevant regions is lowered. Thus, embodiments of the inventive concept relate to provide a method in which the B-spline FFD model known to be efficient is used and the performance of registration is exactly provided with respect to a region in which a motion is sharply changed.

According to an exemplary embodiment of the inventive concept, a target image is divided into a plurality of regions with consideration for a characteristic of a motion of each region, registration is made with respect to each region, and registration results are merged. According to an exemplary embodiment of the inventive concept, a target image may be divided into two regions for the sake of easy description.

The dividing of a target image into regions may be made using a variety of image division techniques generally known. A registration operation on each region may be performed using a variety of image registration methods based on a similarity function, such as Mutual Information (MI), cross correlation, Sum of Squared Differences (SSD), structural similarity (SSIM), CEIO, and so on. B-spline FFD, TPS, and flow-based model may be used as a conversion model. According to an exemplary embodiment of the inventive concept, a normalized MI similarity function and the B-spline FFD model may be used with consideration for performance and efficiency. Also, preliminary information on a characteristic of a motion in each region is added to image registration as constraint, thereby improving performance of registration on each region. Known constraints may include volume preserving, mass preserving, thin plate model, orthonormal model, and so on.

Also, it is essential to merge registration results on image regions formed through the above-described procedure. Problems that can easily occur upon merging may include distortion that is generated at a boundary between two regions. This has a bad influence on forming motion information that will be obtained through the following procedure. For this reason, there is required a technique for preventing the distortion from being generated upon merging.

Accordingly, embodiments of the inventive concept provide a technique capable of solving the above-described problems. If two pieces of motion information exist together at a boundary between two regions, there is selected a piece of motion information that makes performance of registration more exact and to which a characteristic of a motion due to a respiration is applied for smooth merging. An energy cost function of the following equation (1) is defined as a means for solving the problem and expands to a graph-cut optimization problem. That is, refinement is made with respect to a respiration-region motion filed at a boundary during merging, and a graph-cut algorithm is used in the refinement.

$$E(l_{x_i}) = \sum_{x_i \in \Omega} E_{data}(l_{x_i}) + \lambda_{gc} \cdot \sum_{\{x_i, x_j\} \in N_{gc}} E_{smooth}(l_{x_i}, l_{x_j}) \quad \text{Equation 1}$$

Here, $l_{s_i}$ (or $l_{x_i}$)$\in \{0,1\}$, and $\lambda_{gc}$ is a weight, $N_{gc}$ indicates a set (pair) of adjacent voxels interacting. "$E_{data}$" is defined such that accuracy of a motion is applied and is expressed by the following equation (2). In some embodiments, there may be used a variety of similarity functions, such as mutual information (MI), cross correlation, sum of squared differences (SSD), structural similarity (SSIM), CEIO, and so on.

In exemplary embodiments, there may be used a joint probability Pr(·) involving relatively less computation.

$$E_{data}(l_{x_i}) = -\ln Pr(I_T(x_i), (I_S(T(x_i; l_{x_i})))$$
Equation 2

Here, "IT" is a target image to be merged, and "IS" is a source image to be converted. In addition, $T(x_i; l_{x_i})$ indicates a conversion equation decided according to a voxel level.

"$E_{smooth}$" is defined using a difference between pieces of motion information, overlapping and existing at a boundary, such that reliability of estimated motion information is applied and is expressed by the following equation (3).

$$E_{smooth}(l_{x_i}, l_{x_j}) = \delta_{l_{x_i}, l_{x_j}} \cdot \exp\left(\frac{-\min_{l_{x_i}, l_{x_j}}(D(x_i, x_j; l_{x_i}, l_{x_j}))^2}{2\sigma_{gc}^2}\right),$$
Equation 3 where $$D(x_i, x_j; l_{x_i}, l_{x_j}) =$$

$$a(\theta(x_i, x_j; l_{x_i}, l_{x_j})) \cdot \| mv(x_i; l_{x_i}) - mv(x_j; l_{x_j}) \|$$

$$\theta(x_i, x_j; l_{x_i}, l_{x_j}) = \arccos\left(\frac{mv(x_i; l_{x_i}) \cdot mv(x_j; l_{x_j})}{|mv(x_i; l_{x_i})| \cdot |mv(x_j; l_{x_j})|}\right),$$

and $$a(\theta) = \frac{1 + \cos\theta}{2}$$

Here, $$\delta_{l_{x_i}, l_{x_j}}$$

indicates "Kronecker delta", and $\sigma_{gc}$ is a range adjustment parameter. Also, $\|\cdot\|_2$ indicates "L2-norm", $mv(x_i; l_{x_i})$ means a motion vector decided according to a voxel level.

4. Calculation of Four-Dimensional Motion Information and Generation of Four-Dimensional CT Image (112, 114)

Figure 2:
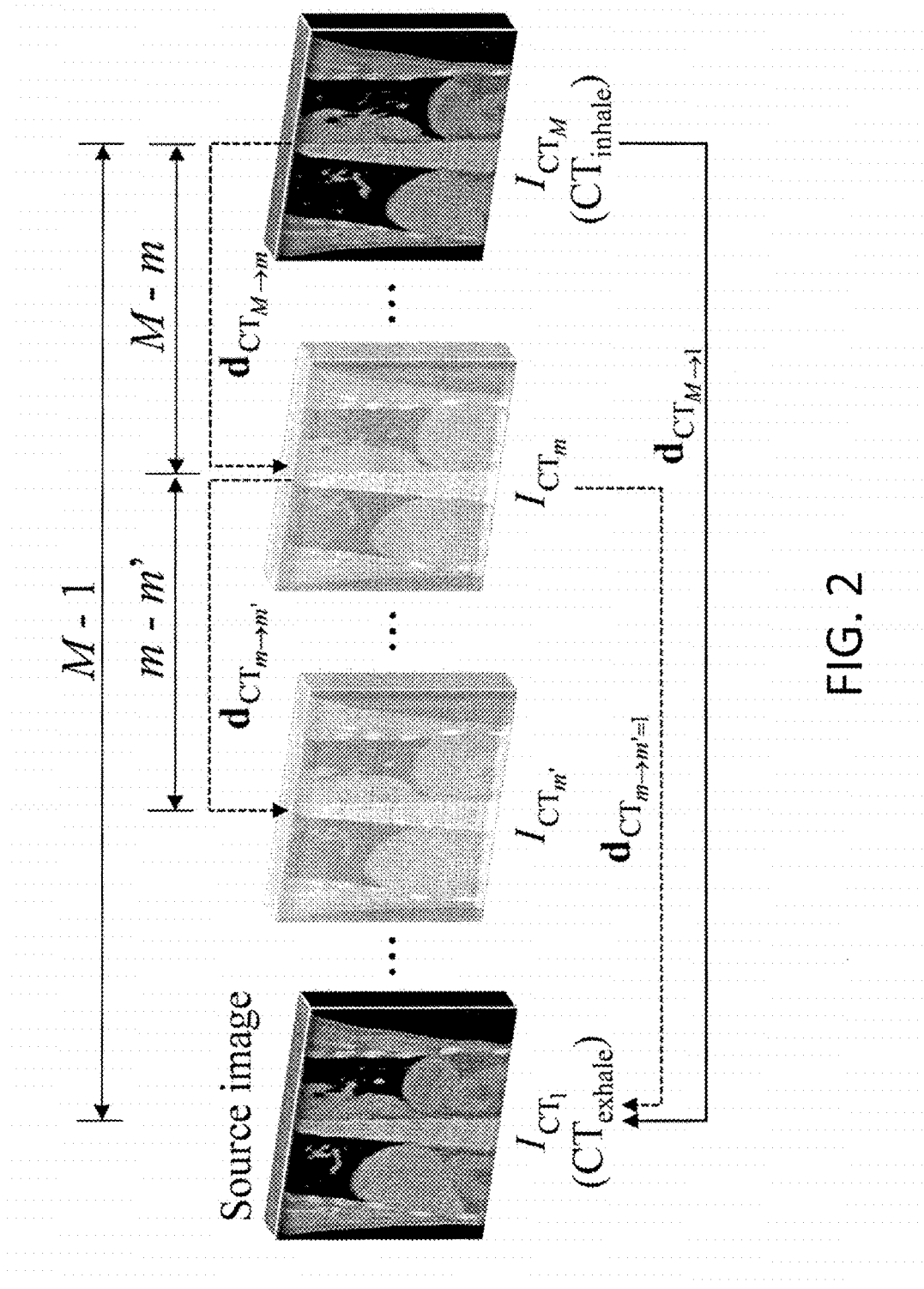
FIG. 2 is a diagram for describing an operation of generating a virtual CT image at any respiration, according to an exemplary embodiment of the inventive concept.

As a result of registering two CT images having different motion states obtained through the above-described procedure, displacement field information may be helpful to generate a 4D CT image. Motion information between CT images is calculated by performing interpolation on the displacement field thus obtained. There may be used a variety of interpolation methods: cubic spline, and linear. In exemplary embodiments, as illustrated in FIG. 2, a displacement field is interpolated to be proportional to a relative distance at any respiration to be formed, and a virtual CT image on the respiration is generated using the interpolation result.

If respiratory states of inhalation and exhalation are named "1" and "M", a respiration-motion displacement field $d_{CT_{M \to m}}$ from an M-th respiratory state to any m-th respiratory state is expressed by the following equation (4).

$$d_{CT_{M \to m}}(x_{CT_M}) = \frac{M - m}{M - 1} \cdot d_{CT_{M \to 1}}(x_{CT_M})$$
[Equation 4]

Here, $1 \leq m \leq M$, and $x_{CT_M}$ indicates an integer voxel position at an image corresponding to the M-th respiratory state. Also, $d_{CT_{M \to 1}}$ indicates a respiration displacement field for converting an image corresponding to a $1^{st}$ respiratory state into an image corresponding to the M-th respiratory state. Similarly, a displacement field for converting an image corresponding to an m'-th respiratory state into an image corresponding to the m-th respiratory state is expressed by the following equation (5).

$$d_{CT_{M \to m'}}(x_{CT_M}) = \frac{1}{\sum_{x'_{CT_m} \in N_{4D}} \exp\left(-\frac{(x_{CT_M} - x'_{CT_m})^2}{2\sigma_{4D}^2}\right)}$$
Equation 5

$$\sum_{x'_{CT_m} \in N_{4D}} \exp\left(-\frac{(x_{CT_M} - x'_{CT_m})^2}{2\sigma_{4D}^2}\right) \cdot d_{CT_{M \to m'}}(x'_{CT_m})$$

where $$d_{CT_{M \to m'}}(x'_{CT_m}) = \left(\frac{m - m'}{M - 1}\right) \cdot d_{CT_{M \to m'}}(x_{CT_M}),$$

and $$x'_{CT_m} = x_{CT_M} + d_{CT_{M \to m'}}(x_{CT_M})$$

Here, "$N_{4D}$" indicates floating coordinates, $x_{CT_M}$ indicates a set of peripheral integer voxels, and $\sigma_{4D}$ indicates a parameter for Gaussian interpolation. Based on the equation (5), a CT image corresponding to the m-th respiratory state is generated using an inhalation CT image $I_{CT_1}$ as expressed by the following equation (6).

$$I_{CT_m}(x_{CT_m}) = I_{CT_1}(x_{CT_m} + d_{CT_{m \to 1}}(x_{CT_m}))$$
Equation 6

FIG. 2 is a diagram for describing an operation of generating a virtual CT image at any respiration, according to an exemplary embodiment of the inventive concept.

5. Selection of CT Images Corresponding to Pieces of PET Data Classified Based on Motion and Determination of Motion Information between Pieces of PET Data (116, 118, 120)

It is essential to match PET data, classified according to a motion and generated through the above-described operations, and virtual 4D CT images and select a CT image corresponding to a relevant respiration. The reason is that such an operation (selecting) directly affects motion information estimation and attenuation correction between pieces of phase-matched PET data.

Figure 3:
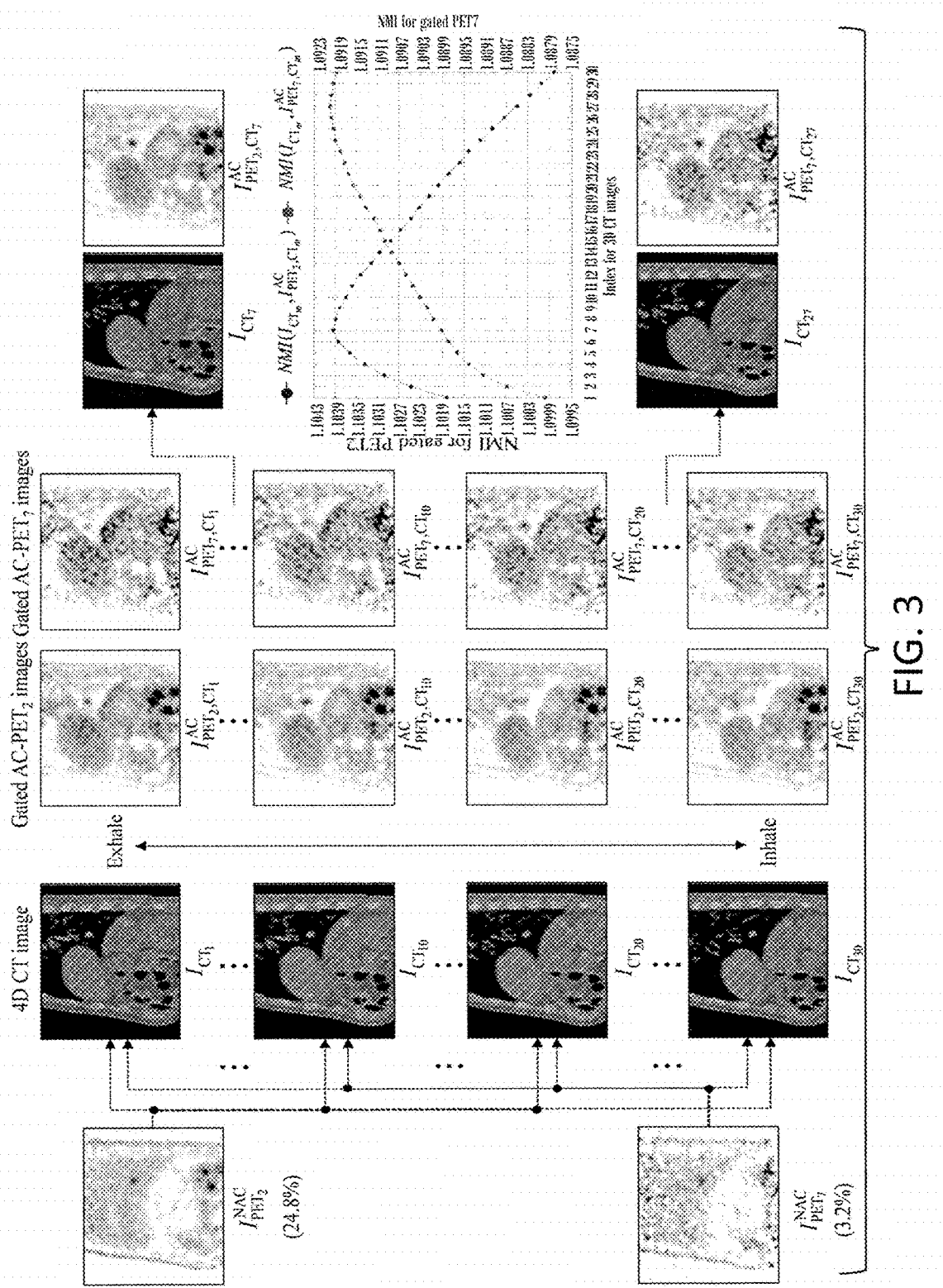
FIG. 3 is a diagram showing that normalized MI effectively operates when the degree of attenuation distortion is used to select a CT image corresponding to phase-matched PET data.

According to an exemplary embodiment of the inventive concept, there is provided a technique of searching for a corresponding CT based on an image, without using additional devices, such as an external sensor. At this time, the important concept is to apply a distortion degree of attenuation correction to a cost function for matching. That is, the following concept may be used: if a specific CT image exactly corresponds to a PET image corresponding to a specific motion, there is minimized distortion due to incorrect attenuation correction upon performing the attenuation correction using the specific CT image. In exemplary embodiments, the normalized MI is used to measure the distortion degree. FIG. 3 is a diagram showing that normalized MI effectively operates when the degree of attenuation distortion is used to select a CT image corresponding to phase-matched PET data.

It is possible to provide a method for independently searching for a CT image corresponding to a motion-based PET image using the above-mentioned normalized MI. As another method, it is possible to provide a method for searching for a matching set of CT images at a time such that attenuation correction on all existing phase-matched PET images is minimally distorted. In this method, a Viterbi search method is used for an efficient computation time, and a distortion phenomenon of attenuation correction between adjacent PET data and accuracy of motion estimation are applied together to improve matching performance, which is illustrated in FIG. 4.

Figure 4:
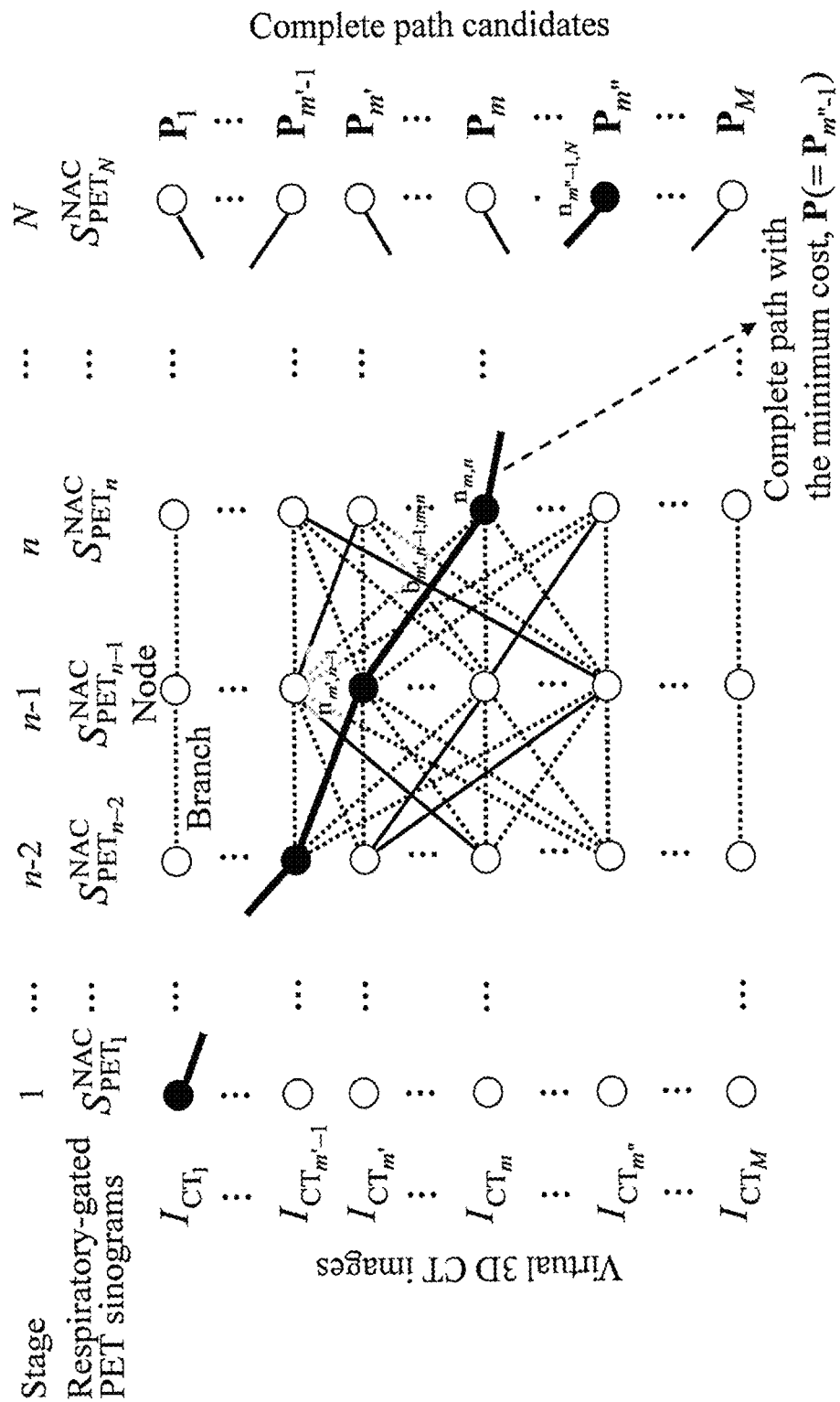
FIG. 4 is a diagram for describing a method for searching for a matching set of CT images at a time such that attenuation correction on all existing phase-matched PET images is minimally distorted, according to an exemplary embodiment of the inventive concept.
Figure 5:
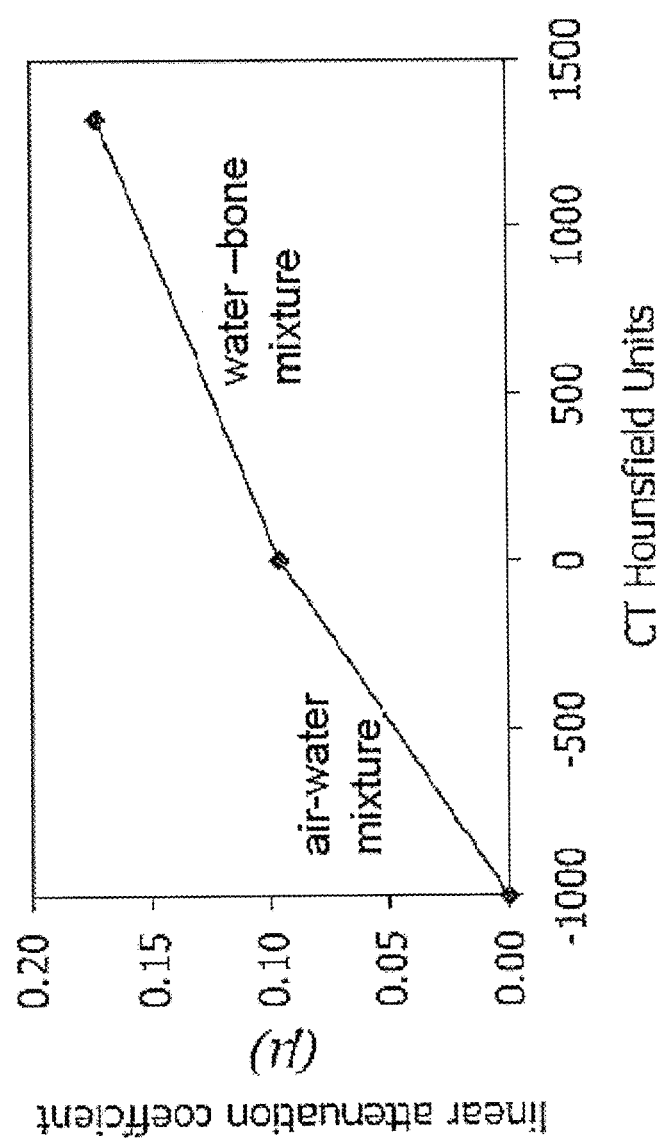
FIG. 5 is a diagram for describing an method of generating an attenuation correction map of PET data, classified according to a motion, using motion-based CT images, according to an exemplary embodiment of the inventive concept.

FIG. 4 is a diagram for describing a method for searching for a matching set of CT images at a time such that attenuation correction on all existing phase-matched PET images is minimally distorted, according to an exemplary embodiment of the inventive concept. In FIG. 4, an upper horizontal axis indicates phase-matched PET data, and a left vertical axis indicates virtual 4D CT images generated through the above-mentioned operations. Each column means a stage, and an optimal matching set is found based on match results until a final N-th stage. At this time, a cost function used may include node costs and branch costs. The following equation (7) is defined such that a distortion level of attenuation correction and accuracy of respiratory motion estimation are applied.

$$C_{node}(m,n) = -NMI(I_{CT_m}(x_{CT_m}), I_{PET_n, CT_m}^{AC}(x_{PET_n})),$$
$$1 \leq m \leq M, \ 1 \leq n \leq N$$

$$C_{branch}(m', n-1; m, n) = -CC(I_{PET_n, CT_m}^{AC}(x_{PET_n}),$$
$$I_{PET_{n-1}, CT_{m'}}^{AC}(x_{PET_{n-1}, CT_m}(x_{PET_n} + d_{CT_{m-m'}}(x_{PET_n})))$$
$$1 \leq m, m' \leq M, \ 2 \leq n \leq N \quad \text{Equation 7}$$

Here, $\lambda_{node}$ and $\lambda_{branch}$ indicates weight values of node and branch costs, $x_{PET_n}$ indicates voxel position coordinates of an PET image corresponding to an n-th respiration state. In the equation (7), $x_{CT_m}$ may be interpreted as being the same voxel position coordinates as $x_{PET_n}$. "NMI( )" means normalized MI, and "CC( )" means cross correlation. Also, $I_{PET_n; CT_m}^{AC}$ means a PET image that is generated by performing attenuation correction on PET data corresponding to an n-th respiratory state using an m-th CT image and reconstructing the corrected PET data.

Meanwhile, the above-described procedure may make it possible to select a CT image corresponding to phase-matched PET data and to obtain respiration-motion displacement field information between selected CT images. Each CT image includes respiration-motion displacement field information, which is effectively used at respiration-motion compensation reconstruction.

Is to various applications extended and applied a technique for searching for CT corresponding to phase-matched PET using distortion of attenuation correction, a matching framework for exactly searching for a 3D CT image, corresponding to phase-matched PET data, from among 4D CT images according to an exemplary embodiment of the inventive concept. For example, upon matching practically acquired conventional 4D CT images and phase-matched PET images or when PET data, corresponding to a specific respiration, and CT images of different respiratory states are provided, an exact CT image corresponding to a respiration may be acquired by measuring how much attenuation distortion occurs between them and iteratively changing a CT image such that the attenuation distortion is minimized. This may be implemented by the following embodiments.

As a first embodiment, there are received practically acquired conventional 4D CT images and at least one PET data classified according to a respiratory motion. Next, the 4D CT images and PET images, which are generated by reconstructing the PET data, are matched up every respiration. At this time, attenuation correction and reconstruction are performed with respect to the phase-matched PET data, and a CT image corresponding to phase-matched PET data is selected using a distortion degree of attenuation correction measured from the reconstructed PET image.

As a second embodiment, there are received CT images of different respiratory states and PET data corresponding to a specific respiration. Next, the input CT image and PET data are matched up. Attenuation correction and reconstruction are performed with respect to the phase-matched PET data, and a CT image corresponding to phase-matched PET data is selected using the distortion degree of attenuation correction measured from the reconstructed PET image. At this time, a CT image corresponding to a respiration is selected by iteratively changing the CT image such that the attenuation distortion is minimized.

6. Generation of Distortion Correction Factor of PET Data Classified According to Motion Using Selected Motion-Based CT Image (124, 126)

Distortion correction factors, which vary according to a respiration and are obtained from the above-described procedure, that is, attenuation and scattering are corrected. In the attenuation correction, an issue that will be considered when using CT images is that attenuation coefficients corresponding to radiation energies (e.g., 511 KeV (PET) and 80~120 KeV (CT)) used in two equipment (PET and CT) are different from each other because the radiation energies are different from each other.

In recent, the most widely used method is to construct a virtual image with attenuation information corresponding to 511 KeV by applying a value of a CT image to a conversion function (refer to FIG. 4), which is referred to as "attenuation coefficient map". FIG. 4 is a diagram for describing the generating of distortion correction factors of PET data classified according to a motion using selected motion-based CT images, according to an exemplary embodiment of the inventive concept. Line integral $$\left( \int_{x \in S} \mu(x) ds \right)$$

on a value of an attenuation coefficient map is made, and a resultant value of the line integral is used as an attenuation compensation coefficient. The attenuation compensation is performed by multiplying the attenuation compensation coefficient and sinograms. In an equation for the line integral, $\mu$ indicates a value of the attenuation coefficient map, "x" indicates a position, and "S" indicates a straight line corresponding to a point of sinogram. That is, $$\int_{x \in S} \mu(x) ds$$

means that the line integral is performed with respect to a value of the attenuation coefficient map on a straight line corresponding to a point of sinogram.

The scattering distortion as well as the attenuation correction is corrected every phase-matched PET data. In recent, the single scatter simulation based scattering correction has been used. At this time, since it is possible to use the exact attenuation coefficient map that is based on a motion and is above obtained, the scattering correction is performed more exactly.

7. Reconstruction of Motion- and Distortion-Corrected Final PET Image (128, 130)

Pieces of PET sinogram data classified according to a motion are corrected into a PET image corresponding to a respiratory position using the above obtained distortion correction factors and determined final motion information.

This may be accomplished through a reconstruction method using the following equation (8). This may be a method in which a respiration model is included together in a system matrix for PET reconstruction and is then reconstructed, and the performance of the method is known as being higher than those of conventional methods.

$$J_{n'}^{(i+1)} = \frac{J_{n'}^{(i)}}{\sum_{n=1}^{N} (t_n A T_{n \to n'})^T 1} \sum_{n=1}^{N} (t_n A T_{n \to n'})^T \frac{S_n}{t_n A T_{n \to n'} J_{n'}^{(i)}},$$

$$1 \leq n, n' \leq N$$

Equation 8

Here, "i" means the number of repetition, and "n" in an index indicating a reference respiratory state. "n" is an index for sorting respiratory states of PET. "A" means a system matrix, and $T_{n \to n'}$ means a conversion equation for converting an image from the reference respiratory state to an n-th ris state. This conversion equation may be previously obtained through the fifth step (116, 118, 120). $S_n$ and $J_{n'}$ mean PET sinogram data of an n-th respiratory state and a respiration-motion-compensated PET image at a reference respiratory position.

Meanwhile, the above-described method according to an exemplary embodiment of the inventive concept may be implemented with a computer-executable program. Codes and code segments constituting the program may be easily inferred by a computer programmer skilled in the art. Also, the program may be stored in the computer-readable storage media (information storage media), and the method according to an exemplary embodiment of the inventive concept may be implemented by reading and executing the program stored in the computer-readable storage media. The storage media may include all types of computer-readable storage media.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

INDUSTRIAL APPLICABILITY

It is possible to apply embodiments of the inventive concept to motion compensation and phase-matched attenuation correction of PET images using the small number of low-radiation-dose CT images.

What is claimed is:

1. A method for constructing a positron emission tomography (PET) image, comprising:
   acquiring phase-matched PET data;
   acquiring CT images corresponding to at least two different respiratory states and generating a virtual 4D CT image using the acquired CT images;
   selecting 3D CT images, corresponding to the phase-matched PET data, from among the 4D CT images; and
   performing phase-matched attenuation correction and phase-matched scattering correction on the phase-matched PET data using the selected 3D CT images.

2. The method of claim 1, further comprising:
   performing respiratory motion compensation and reconstruction on the phase-matched PET data, suffering the attenuation correction and the scattering correction, using a selected 3D CT image corresponding to each respiration.

3. The method of claim 2, wherein respiratory motion information among phase-matched PET data is estimated by matching the virtual 4D CT image and a phase-matched PET image using a distortion phenomenon of the attenuation correction.

4. The method of claim 1, wherein each of the CT images acquired at the different respiratory states is obtained and utilized using about 10~50% of a radiation doze that is used when scanning one discrete CT image.

5. The method of claim 1, wherein different respirations corresponding to the at least two different respiratory states include inhalation and exhalation or inhalation, exhalation and an intermediate respiration.

6. The method of claim 1, wherein the phase-matched PET data is acquired in a list-mode PET data acquisition mode, with a respiratory gating system mounted on a patient's chest or abdomen.

7. The method of claim 1, wherein the generating of a virtual 4D CT image comprises:
   dividing the CT images of different respirations into regions according to a motion characteristic;
   performing image registration every region;
   merging the image-registered regions.

8. The method of claim 7, wherein the performing of image registration every region is made using B-spline FFD (Free Form Deformation) conversion.

9. The method of claim 8, wherein motion characteristic information of each region is applied to the B-spline FFD conversion as a constraint.

10. The method of claim 7, wherein the merging of the image-registered regions comprises:
    performing refinement on a respiratory region motion field at a boundary.

11. The method of claim 10, wherein the refinement is performed using a graph-cut algorithm.

12. The method of claim 1, wherein the performing of phase-matched attenuation correction and phase-matched scattering correction comprises:
    matching CT images, corresponding to the phase-matched PET data, from among the 4D CT images.

13. The method of claim 12, wherein the matched CT images are selected by performing attenuation correction and reconstruction on the phase-matched PET image and searching for a CT image corresponding to phase-matched PET data using a distortion degree of the attenuation correction measured from the reconstructed image.

14. The method of claim 12, wherein a CT image corresponding to phase-matched PET data is selected using the distortion degree of the attenuation correction independently every phase-matched PET data.

15. The method of claim 12, wherein a CT image corresponding to phase-matched PET data is selected using the distortion degree of the attenuation correction such that a sum of a whole distortion degree of the attenuation correction and a respiratory motion error degree is minimized, under the condition that phase-matched PET data is used as a whole set.

* * * * *

UNITED STATES PATENT AND TRADEMARK OFFICE
CERTIFICATE OF CORRECTION

PATENT NO. : 9,582,906 B2  
APPLICATION NO. : 14/421769  
DATED : February 28, 2017  
INVENTOR(S) : Ra et al.

Page 1 of 1

It is certified that error appears in the above-identified patent and that said Letters Patent is hereby corrected as shown below:

On the Title Page

Item (72) should read:  
Jong-beom Ra, Daejeon (KR);  
Woo-hyun Nam, Daejeon (KR);  
Il-jun Ahn, Daejeon (KR);  
Ji-hye Kim, Daejeon (KR);  
Yong-jin Jang, Daejeon (KR)

Signed and Sealed this  
Twenty-seventh Day of August, 2019

Andrei Iancu  
*Director of the United States Patent and Trademark Office*